United States Patent
Matsushita et al.

(10) Patent No.: US 11,214,109 B2
(45) Date of Patent: Jan. 4, 2022

(54) VEHICLE SUSPENSION ARM

(71) Applicant: HONDA MOTOR CO., LTD., Tokyo (JP)

(72) Inventors: Kosuke Matsushita, Wako (JP); Hidehiro Nozaki, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 65 days.

(21) Appl. No.: 16/582,253

(22) Filed: Sep. 25, 2019

(65) Prior Publication Data
US 2020/0101807 A1 Apr. 2, 2020

(30) Foreign Application Priority Data
Sep. 28, 2018 (JP) .............................. JP2018-183629

(51) Int. Cl.
*B60G 7/00* (2006.01)
*B60G 3/06* (2006.01)
B60G 15/06 (2006.01)

(52) U.S. Cl.
CPC ............... *B60G 7/001* (2013.01); *B60G 3/06* (2013.01); *B60G 7/005* (2013.01); *B60G 15/062* (2013.01); *B60G 2200/10* (2013.01); *B60G 2202/312* (2013.01); *B60G 2204/14* (2013.01); *B60G 2206/016* (2013.01)

(58) Field of Classification Search
CPC .......... B60G 7/001; B60G 7/005; B60G 3/06; B60G 2206/016; B60G 2200/10; B60G 2202/312; B60G 2204/14; B60G 15/062; B60G 2206/122; B60G 7/00
See application file for complete search history.

(56) References Cited

U.S. PATENT DOCUMENTS

| | | | | |
|---|---|---|---|---|
| 5,362,090 A | * | 11/1994 | Takeuchi | ................. B60G 3/06 280/124.146 |
| 5,516,129 A | * | 5/1996 | Kurosu | ................. B60G 7/001 280/124.134 |

(Continued)

FOREIGN PATENT DOCUMENTS

| CN | 302455250 S | 6/2013 |
|---|---|---|
| JP | S61-201908 U | 12/1986 |

(Continued)

OTHER PUBLICATIONS

Office Action received in corresponding Japanese application No. 2018-183629 dated Oct. 19, 2021 with English tranlsation (8 pages).

(Continued)

*Primary Examiner* — Darlene P Condra
(74) *Attorney, Agent, or Firm* — Rankin, Hill & Clark LLP

(57) ABSTRACT

A vehicle suspension arm includes: a wheel support portion which supports a wheel through a ball joint serving as a joining member; a front side vehicle body installation portion serving as a vehicle body installation portion which is installed in a vehicle body; and a wheel side portion which joins the wheel support portion to the front side vehicle body installation portion. The wheel side portion includes an offset portion, which has a cross-sectional shape with a gravity center being offset upward or downward from a straight line that connects the ball joint to the front side vehicle body installation portion.

4 Claims, 4 Drawing Sheets

(56) References Cited

U.S. PATENT DOCUMENTS

| | | | |
|---|---|---|---|
| 5,992,867 A * | 11/1999 | Kato | B60G 3/06 |
| | | | 280/124.134 |
| 6,572,126 B2 * | 6/2003 | Tunzini | B60G 7/001 |
| | | | 280/124.134 |
| 2011/0115186 A1 * | 5/2011 | Chiku | B60G 7/001 |
| | | | 280/124.134 |
| 2011/0272911 A1 * | 11/2011 | Gerhards | B60G 7/001 |
| | | | 280/124.134 |
| 2012/0153592 A1 | 6/2012 | Mielke et al. | |
| 2014/0210177 A1 * | 7/2014 | Dicke | B60G 7/001 |
| | | | 280/124.134 |
| 2016/0318362 A1 * | 11/2016 | Watanabe | B60G 7/001 |
| 2016/0347138 A1 * | 12/2016 | Suzuki | B60G 7/001 |

FOREIGN PATENT DOCUMENTS

| | | |
|---|---|---|
| JP | H11-217014 A | 8/1999 |
| JP | 2003-211929 A | 7/2003 |
| JP | 2004-262453 A | 9/2004 |
| JP | 2004-322877 A | 11/2004 |
| JP | 2012-006586 A | 1/2012 |
| JP | 2016-182657 A | 10/2016 |

OTHER PUBLICATIONS

Notice of Submission of Publications, etc received in corresponding Japanese application No. 2018-183629 dated Oct. 5, 2021 with English tranlsation (18 pages).

* cited by examiner

VEHICLE SUSPENSION ARM

BACKGROUND OF THE INVENTION

1. Field of the Invention

The present invention relates to a vehicle suspension arm used for allowing a vehicle body to support a wheel.

2. Description of the Related Art

Various structures have heretofore been proposed for a vehicle suspension arm used for allowing a vehicle body to support a wheel.

For example, a vehicle suspension arm according to Patent Literature 1 is designed to have a cross-sectional shape which is line-symmetric with respect to an axis extending along a body portion and passing through a gravity center (a center of the cross section) thereof.

By adopting this structure, a component force axis of a load applied to the suspension arm overlaps the gravity center.

This structure achieves both an increase in rigidity and a reduction in weight of the suspension arm while curtailing its redundant regions that do not contribute to the rigidity.

PRIOR ART DOCUMENT(S)

Patent Literature(s)

Patent Literature 1: JP2004-262453A

SUMMARY OF THE INVENTION

Incidentally, a wheel is joined to a suspension arm through a ball joint that is a free joint. In the ball joint, a spherical head shaft is rotatably inserted into a socket.

Meanwhile, if an excessive load originating from a collision accident or the like is inputted in a vehicle width direction to the vehicle suspension arm, the suspension arm is supposed to buckle so as to absorb an impact.

As a consequence, if the suspension arm buckles in a direction to move the spherical head shaft away from the socket (in a pulling direction), for example, the wheel is prone to come off the vehicle body.

If the wheel comes off the vehicle body, it is difficult to move the vehicle by towing. Accordingly, it is desirable to prevent the wheel from coming off in case of a collision.

Nonetheless, according to the structure of the suspension arm proposed in Patent Literature 1, it is uncertain whether the spherical head shaft and the socket would come close (get compressed) to or move away (get pulled) from each other in the event of buckling. Hence, this structure has a problem that the wheel is prone to come off in case of a collision.

The present invention has been made in view of the aforementioned problem and an object thereof is to provide a vehicle suspension arm that can buckle in a predetermined direction in a case of buckling caused by an input of an impact load.

To attain the object, a vehicle suspension arm according to an aspect of the present invention includes a wheel support portion configured to support a wheel through a joining member, a vehicle body installation portion to be installed in a vehicle body, and a wheel side portion configured to join the wheel support portion to the vehicle body installation portion. Here, the wheel side portion of the vehicle suspension arm includes an offset portion, and the offset portion has a cross-sectional shape with a gravity center offset upward or downward relative to an axis of a load indicating a component force to be applied from the wheel to the vehicle body when the load is inputted from a lateral side of the vehicle to the wheel.

According to the present invention, it is possible to provide a vehicle suspension arm that can buckle in a predetermined direction in case of buckling caused by an input of an impact load.

BRIEF DESCRIPTION OF THE DRAWINGS

FIGS. 6A to 6E are cross-sectional views of the vehicle suspension arm according to the embodiment, in which FIG. 6A is a cross-sectional view taken along the A-A line in FIG. 4 and showing an offset portion located outside the center of the offset portion, FIG. 6B is a cross-sectional view taken along the B-B line in FIG. 4 and showing the vicinity of the center of the offset portion, FIG. 6C is a cross-sectional view taken along the C-C line in FIG. 4 and showing the vicinity of the center of the offset portion, FIG. 6D is a cross-sectional view taken along the D-D line in FIG. 4 and showing the offset portion located outside the center of the offset portion, and FIG. 6E is a cross-sectional view taken along the E-E line in FIG. 4 and showing a region other than the offset portion.

DETAILED DESCRIPTION OF THE EMBODIMENTS

An embodiment of the present invention will be described in detail with reference to the accompanying drawings. In the following description, the same elements are denoted by the same reference signs and overlapping explanations will be omitted.

Figure 1:
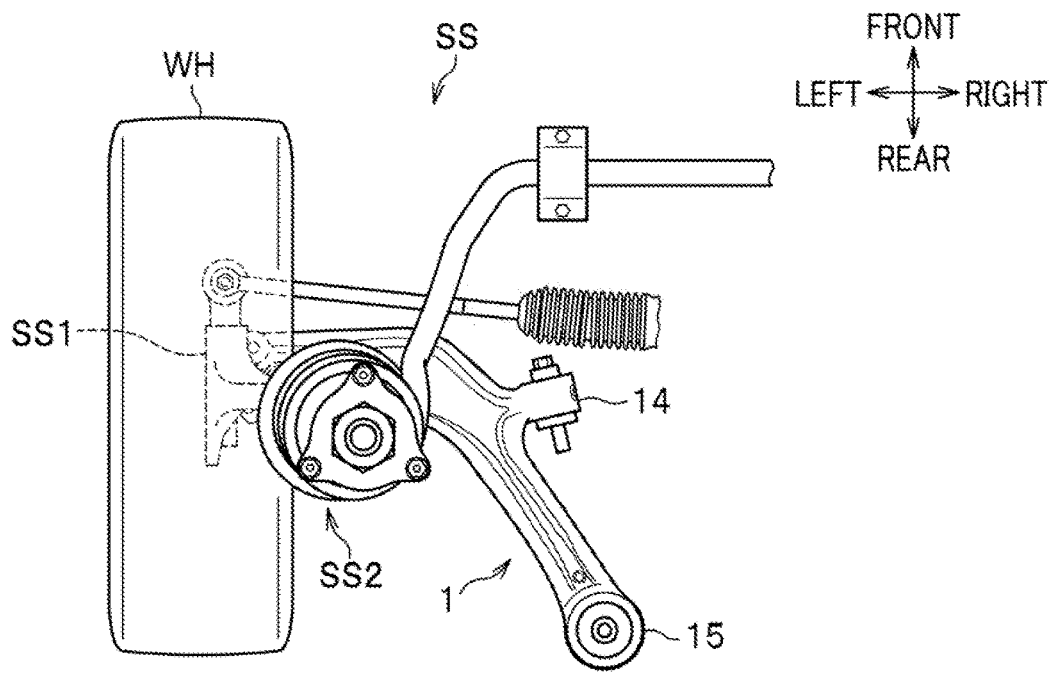
FIG. 1 is a plan view showing a suspension system related to a vehicle suspension arm according to an embodiment of the present invention.
Figure 2:
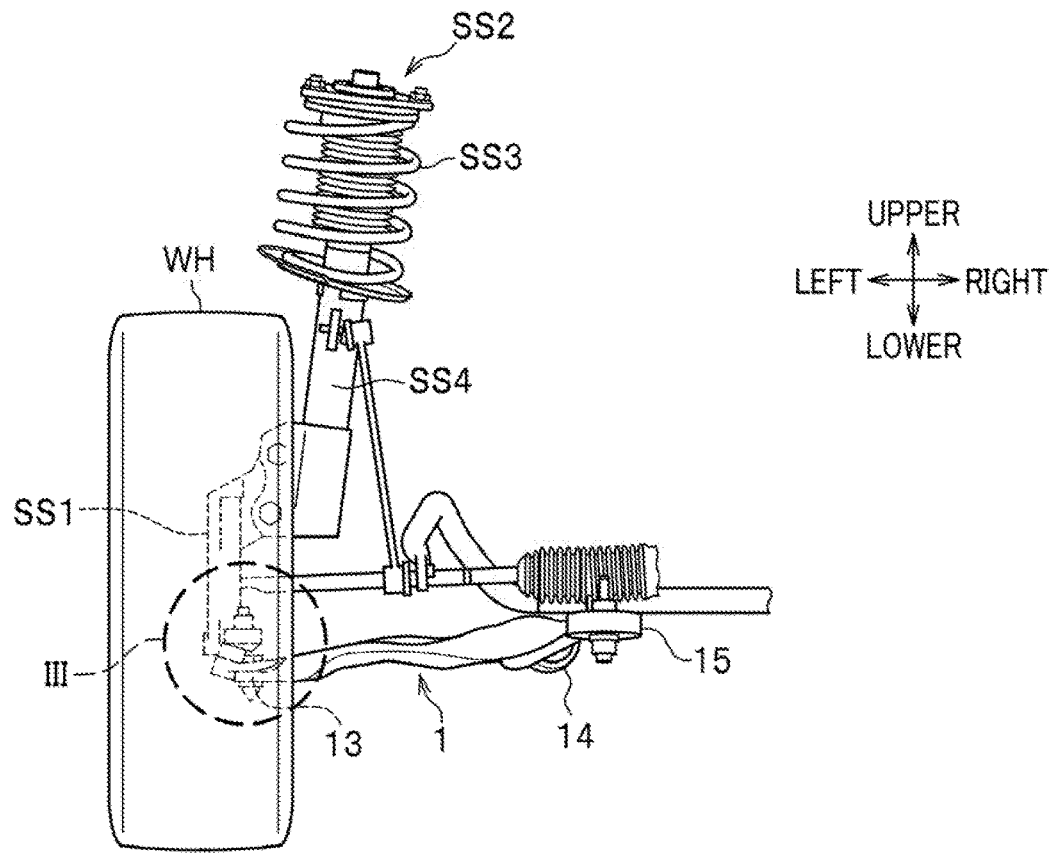
FIG. 2 is another view of the suspension system related to the vehicle suspension arm according to the embodiment, which is viewed from back to front of a vehicle.

As shown in FIGS. 1 and 2, in this embodiment, a vehicle suspension arm is used as a lower arm 1 that constitutes a suspension system SS.

The suspension system SS of this embodiment is configured to allow a vehicle body to steerably support a steering wheel (a wheel WH) that is used to change a traveling direction of a vehicle. This embodiment adopts a strut-type suspension.

Moreover, the strut-type suspension includes a knuckle SS1, a strut assembly SS2, the lower arm 1 (the vehicle suspension arm), and a ball joint 20 (a joining member).

The knuckle SS1 is configured to support the wheel WH in a steerable manner (see FIGS. 1 and 2).

The knuckle SS1 is supported by the vehicle body through the strut assembly SS2 and the lower arm 1. Moreover, the knuckle SS1 is integrally fixed to the strut assembly SS2. Meanwhile, the knuckle SS1 is joined to the lower arm 1 through the ball joint 20.

The strut assembly SS2 is configured to allow the vehicle body to support the wheel WH from above through the knuckle SS1 (see FIG. 2).

The strut assembly SS2 is located between the vehicle body and the knuckle SS1 and configured to absorb and relax vibrations and impacts transmitted to the vehicle body from the wheel WH that moves up and down due to irregularities on a road surface while the vehicle is traveling.

The strut assembly SS2 includes a spring SS3 and a shock absorber SS4.

The lower arm 1 is configured to allow the vehicle body to support the wheel WH from below through the knuckle SS1 (see FIGS. 1 and 2). The lower arm 1 is so-called an L-shaped arm, which has a substantially L-shaped form in plan view and is configured to support the knuckle SS1 while bypassing the wheel WH that is steered. In the meantime, the lower arm 1 is formed into a substantially H-shaped cross section by subjecting a cast material of an aluminum alloy or the like to a forging process (see FIGS. 6A to 6E).

Figure 4:
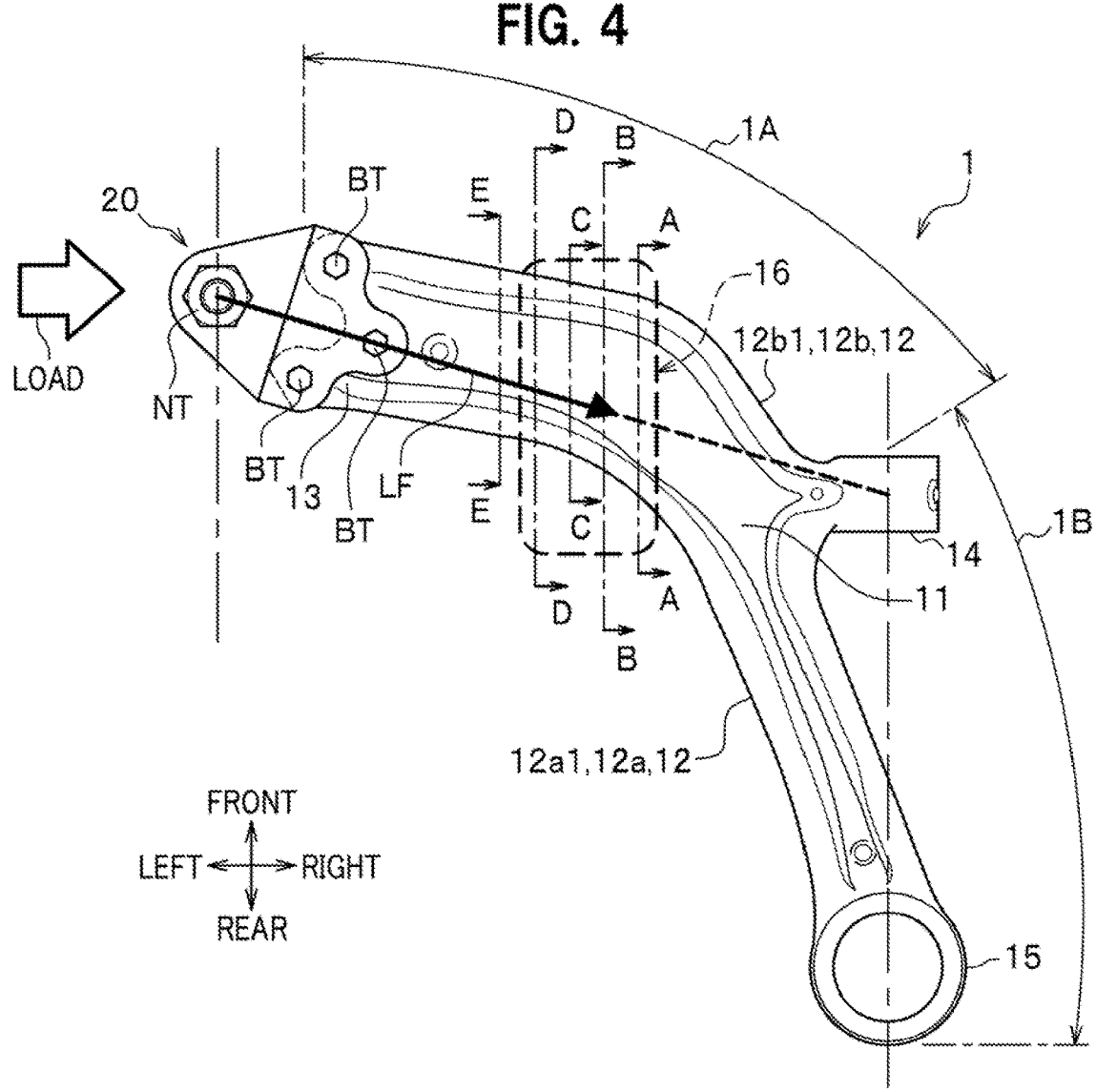
FIG. 4 is a plan view showing the vehicle suspension arm according to the embodiment.
Figure 5:
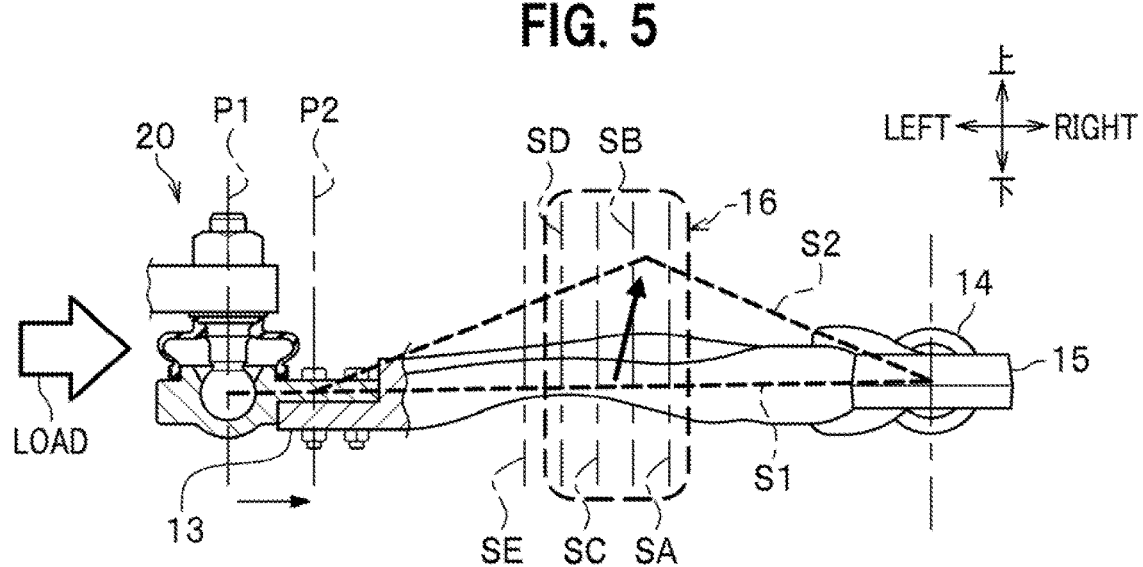
FIG. 5 is another view of the vehicle suspension arm according to the embodiment viewed from back to front of the vehicle, which is also a view indicating positions corresponding to cross sections taken along the A-A line to the E-E line in FIG. 4 by using auxiliary lines SA to SE.

The lower arm 1 includes an arm body 11, side walls 12, a wheel support portion 13, a front side vehicle body installation portion 14 (a vehicle body installation portion), and a rear side vehicle body installation portion 15 (see FIGS. 4 and 5).

In the meantime, the lower arm 1 is formed from a wheel side portion 1A and a vehicle body side portion 1B which are continuous from one side to another side in a longitudinal direction.

In other words, the wheel side portion 1A constitutes a region of lower arm 1 from the wheel support portion 13 to the front side vehicle body installation portion 14 while the vehicle body side portion 1B constitutes a region of the lower arm 1 from the front side vehicle body installation portion 14 to the rear side vehicle body installation portion 15.

The wheel side portion 1A constitutes a straight part on the wheel WH side (the one side) of the lower arm 1 as well as a curved part corresponding to an L-shaped corner part of the lower arm 1 while the vehicle body side portion 1B constitutes a straight part on the vehicle body side (the other side) of the lower arm 1.

The vehicle body side portion 1B is joined to the curved vehicle body side end part of the wheel side portion 1A.

The straight part of the wheel side portion 1A and the vehicle body side portion 1B are arranged in such a way as to obliquely cross a component force axis LF of a load.

Provision of the wheel side portion 1A with the curved part enables the vehicle body to support the wheel WH through the lower arm 1 without blocking the steering movement of the wheel WH.

Meanwhile, the wheel side portion 1A is designed to have a large width and a smaller thickness than the vehicle body side portion.

Moreover, the wheel side portion 1A is provided with an offset portion 16.

The offset portion 16 will be described later.

In the meantime, the component force axis LF of the load indicates the component force to be applied from the wheel WH (the knuckle SS1) to the vehicle body when a collision load is inputted from a lateral side of the vehicle to the wheel WH (see FIG. 4).

Moreover, the component force axis LF of the load is indicated by a straight line that connects the center of a portion to fasten the ball joint 20 (the joining member) to the lower arm 1 and the center of the front side vehicle body installation portion 14 (the vehicle body installation portion).

The arm body 11 is formed into a plate shape having a substantially L-shaped form in plan view (see FIG. 4). In the meantime, width dimensions W11 and plate thickness dimensions T11 of the arm body 11 are appropriately set depending on various regions.

The side walls 12 are erected on respective end edges (side edges) in the width direction of the arm body 11 toward an upper side of the vehicle and a lower side of the vehicle from plate surfaces of the arm body 11 (see FIGS. 4 and 6A to 6E). Moreover, a cross-sectional shape of the lower arm 1 is formed substantially into an H-shape by using the arm body 11 and the respective side walls 12.

Here, the side wall 12 on an inner side (an inner edge) of the wheel side portion 1A of the arm body 11 curved substantially in the L-shape will be referred to as an inner side wall 12a, and the side wall 12 on an outer side (an outer edge) of the arc will be referred to as an outer side wall 12b.

In the meantime, a portion of the inner side wall 12a erected toward the upper side of the vehicle from the arm body 11 will be referred to as an upper inner side wall 12a1 and a portion of the inner side wall 12a erected toward the lower side of the vehicle from the arm body 11 will be referred to as a lower inner side wall 12a2, respectively.

Moreover, a portion of the outer side wall 12b erected toward the upper side of the vehicle from the arm body 11 will be referred to as an upper outer side wall 12b1 while a portion of the outer side wall 12b erected toward the lower side of the vehicle from the arm body 11 will be referred to as a lower outer side wall 12b2.

Width dimensions W12 and height dimensions H12 of the each of the side walls 12 are appropriately set depending on various regions.

Meanwhile, the shape of the arm body 11 is set such that an inner side edge of the wheel side portion 1A comes closer to the wheel WH than an outer side edge thereof does when the wheel WH is steered to right and left as a consequence of a steering operation (steering) by a driver.

The wheel support portion 13 includes three through holes which are opened at an end portion on the wheel side of the wheel side portion 1A (an end portion on the one side of the arm body 11) (see FIG. 4). Moreover, a socket 22 constituting the ball joint 20 is fastened to the wheel support portion 13 by using three bolts BT.

The front side vehicle body installation portion 14 is arranged on the outside of the outer side wall 12b located at a continuous part between the wheel side portion 1A and the vehicle body side portion 1B (an intermediate part in the longitudinal direction of the arm body 11) (see FIG. 4). In the meantime, the front side vehicle body installation portion 14 is located at such a position that a straight line (the component force axis LF of the load) that connects the wheel support portion 13 to the front side vehicle body installation portion 14 obliquely crosses the center axis of the front side vehicle body installation portion 14.

In other words, the front side vehicle body installation portion 14 is located at such a position that the component force axis LF of the load extends obliquely to a vehicle width direction.

The front side vehicle body installation portion 14 is formed from a cylindrical member with openings located in a vehicle front-rear direction. A front side collar is inserted into this cylinder.

Meanwhile, a front side support shaft that extends in the vehicle front-rear direction from the vehicle body is inserted into the front side collar.

Moreover, since the vehicle body supports the front side vehicle body installation portion 14 rotatably about the front side support shaft by way of the front side collar, the wheel WH is supported by the vehicle body while being allowed to move vertically.

The rear side vehicle body installation portion 15 is formed at an end portion on the vehicle body side of the vehicle body side portion 1B (an end portion on the other side of the arm body 11) (see FIG. 4).

The rear side vehicle body installation portion 15 is formed from a cylindrical member with openings located in a vehicle up-down direction. A rear side bush is arranged in the cylinder.

Meanwhile, a rear side support shaft that extends in the vehicle up-down direction from the vehicle body is inserted into the rear side bush.

Moreover, since the vehicle body supports the rear side vehicle body installation portion 15 through the rear side bush, the wheel WH is supported by the vehicle body while being deprived of vibrations in the vehicle front-rear direction and in the vehicle width direction which are generated while the vehicle is traveling.

Figure 3:
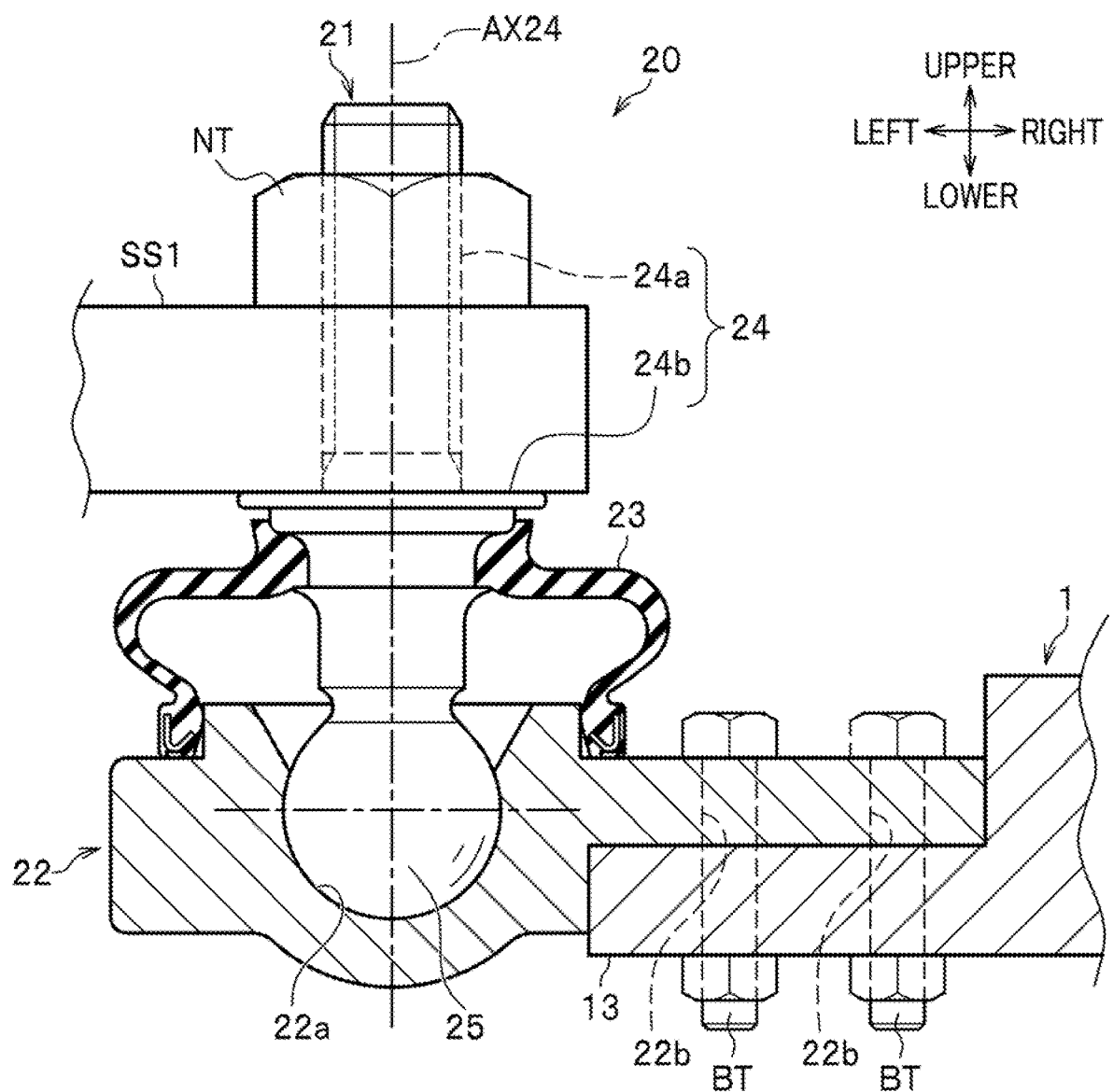
FIG. 3 is an enlarged cross-sectional view of a substantial part that shows a section III in FIG. 2.

Next, a description will be given of the ball joint 20 (the joining member) (see FIG. 3).

The ball joint 20 is a free joint that joins the knuckle SS1 to the lower arm 1, and includes a ball shaft 21, the socket 22, and a boot 23.

The ball shaft 21 includes a shaft portion 24 and a spherical head portion 25.

The shaft portion 24 includes a male screw 24a and a flange 24b.

The shaft portion 24 is fastened to the knuckle SS1 by threadedly engaging a nut NT with the male screw 24a while inserting the male screw 24a through the knuckle SS1 and retaining a state of butting the flange 24b against the knuckle SS1.

The spherical head portion 25 is formed into a spherical shape with its center being located on a center axis AX24 of the shaft portion 24.

The socket 22 includes a spherical recess 22a having the same diameter as that of the spherical head portion 25.

The socket 22 is arranged in an overlapping manner on an upper surface side of the wheel support portion 13 constituting the lower arm 1. Moreover, the socket 22 includes three through holes 22b, and is fastened to the wheel support portion 13 by using the three bolts BT.

The boot 23 is formed by molding a material having flexibility and elasticity such as a rubber material substantially into a cylindrical shape, and is configured to cover and protect a joined portion between the ball shaft 21 and the socket 22.

In the state where the boot 23 covers an inserted portion of the shaft portion 24 into the socket 22, one end side of the boot 23 is fitted and attached firmly to the flange 24b while another end side thereof is fitted and attached firmly to the socket 22. Moreover, a lubricant such as grease is put and sealed inside the cylinder of the boot 23.

In the ball joint 20 configured as described above, the spherical head portion 25 of the ball shaft 21 is inserted into and freely joined to the spherical recess 22a of the socket 22 in a state of spherical-surface contact.

Thus, the ball shaft 21 and the socket 22 are joined together in such a way as to be swingable and pivotally rotatable relative to each other.

Next, a description will be given of the offset portion 16 installed at the wheel side portion 1A of the lower arm 1 (see FIGS. 4 to 6E).

The offset portion 16 in this embodiment represents a region where a gravity center C16 (a center of the cross section) is offset upward from the straight line (the component force axis LF of the load) that connects the wheel support portion 13 to the front side vehicle body installation portion 14 (the vehicle body installation portion).

Here, the gravity center C16 is a point on a cross section derived from a cross-sectional area and a first moment of area of an arbitrary cross section.

Cross-sectional shapes (cross sections A to E) at five locations in the wheel side portion 1A will be described as such arbitrary cross sections (see FIGS. 4 and 6A to 6E). Note that each of the cross sections A to E is a cross section that represents a plane taken along a vertical direction and the vehicle front-rear direction of the lower arm 1.

Figure 6A:
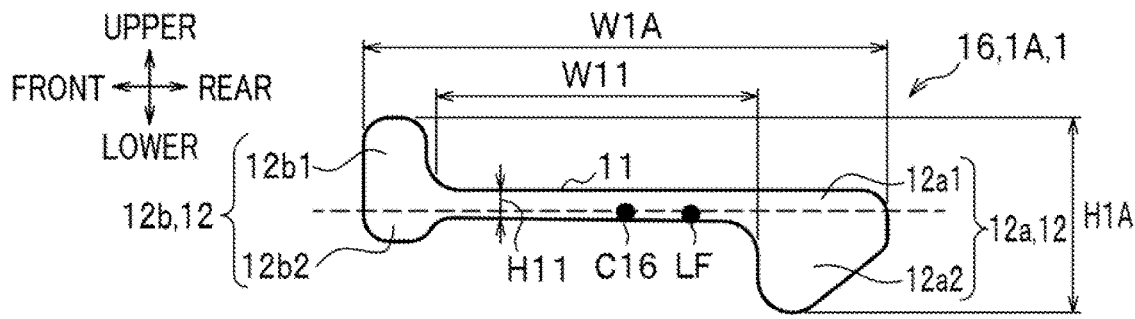
Figure 6B:
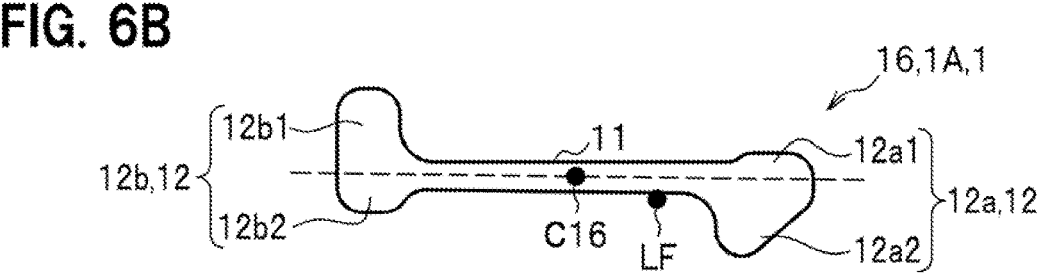
Figure 6C:
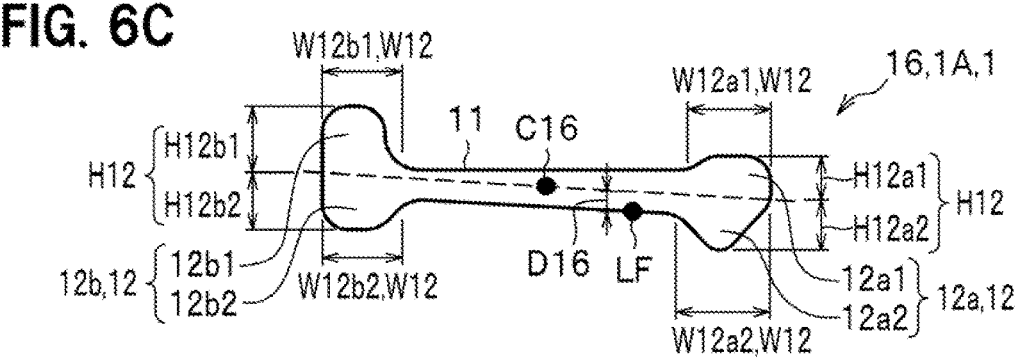
Figure 6D:
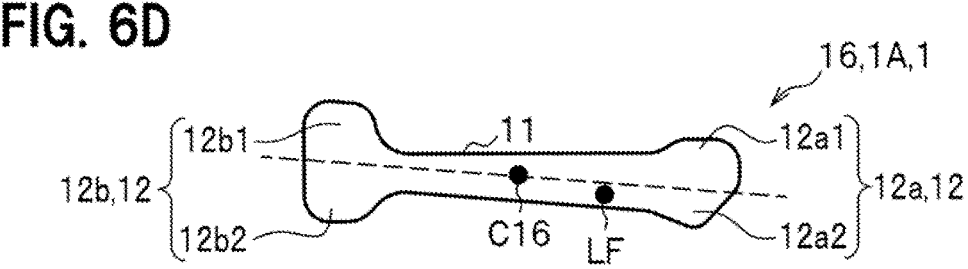
Figure 6E:
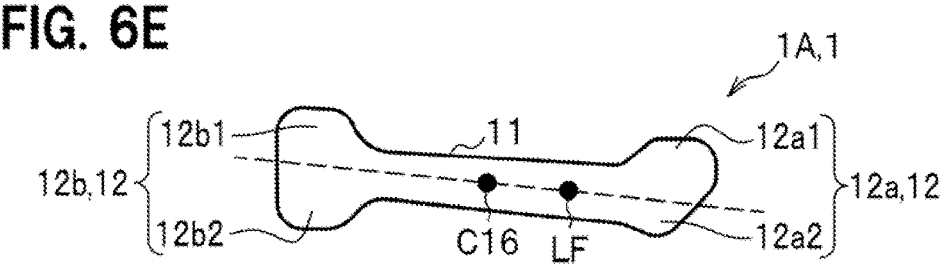

FIG. 6A is a cross-sectional view of part of the offset portion 16 located outside the center of the offset portion 16, and each of FIGS. 6B and 6C is a cross-sectional view of part in the vicinity of the center of the offset portion 16. Meanwhile, FIG. 6D is a cross-sectional view of part of the offset portion 16 located outside the center of the offset portion 16, and FIG. 6E is a cross-sectional view of a region of the wheel side portion 1A other than the offset portion 16.

The offset portion 16 is installed in a region located at substantially equal distances from the ball joint 20 (the joining member) and from the front side vehicle body installation portion 14 (the vehicle body installation portion) in the wheel side portion 1A (see FIG. 4).

In the offset portion 16, the arm body 11 in a thin plate form is set up to form a chevron shape that projects to the upper side of the vehicle (bends upward) such that two end portions in the longitudinal direction of the arm body 11 are placed low while a central part of the offset portion 16 forms a peak.

In other words, the center of the offset portion 16 is provided with a dent so as to be the deepest part on a lower surface side of the arm body 11 in conformity with the shape of an upper surface side thereof. This dent is shown by the lower surface of the arm body 11 in the offset portion 16 being raised relative to the component force axis LF of the load (see FIGS. 6A to 6E).

Moreover, in the offset portion 16 of this embodiment, width dimensions W12a and W12b as well as height dimensions H12a and H12b of the inner side wall 12a and the outer side wall 12b are appropriately set while achieving a balance therebetween.

For example, in the inner side wall 12a, a width dimension W12a2 of the lower inner side wall 12a2 (a reverse side wall), which is the side wall erected in an opposite direction to an offset direction, is set to be larger than a dimension of a region other than the offset portion 16.

Meanwhile, a height dimension H12a1 of the upper inner side wall 12a1 (a forward side wall), which is the side wall erected in the offset direction, is set to be smaller than a dimension of the region other than the offset portion 16 in the wheel side portion 1A (FIG. 6E, for instance).

In the meantime, in the outer side wall 12b, a width dimension W12b1 of the upper outer side wall 12b1 being the side wall erected upward and a width dimension W12b2 of the lower outer side wall 12b2 being the side wall erected downward are set equal to the dimension of the region other than the offset portion 16.

Moreover, a height dimension H12*b*1 of the upper outer side wall 12*b*1 is set larger than the dimension of the region other than the offset portion 16.

Furthermore, a height dimension H12*b*2 of the lower outer side wall 12*b*2 is set smaller than the dimension of the region other than the offset portion 16.

According to the configurations of the arm body 11, the inner side wall 12*a*, and the outer side wall 12*b* described above, an offset amount D16 is gradually increased toward the center of the offset portion 16 along the component force axis LF of the load.

In this way, it is possible to set the larger offset amount D16 that is directed to the upper side of the vehicle without reducing flexural rigidity in the up-down direction.

Note that in this embodiment, the gravity center C16 is offset not only toward the upper side of the vehicle but also toward the front of the vehicle relative to the component force axis LF of the load.

For this reason, in terms of each of the cross sections of the lower arm 1, if an excessive load from outside to inside in the vehicle width direction is inputted to the wheel WH, a stress is applied in an obliquely upward and forward direction from the component force axis LF of the load to the gravity center C16 (see FIGS. 6A to 6E).

On the other hand, a dimension W1A in the front-rear direction of the wheel side portion 1A is set sufficiently larger than a dimension H1A in the vehicle up-down direction thereof.

As a consequence, if an excessive load from the outside to the inside in the vehicle width direction is inputted to the wheel WH, the wheel side portion 1A buckles toward the upper side of the vehicle into the chevron shape (bends upward) before the wheel side portion 1A buckles toward the front of the vehicle.

In other words, as the offset amount D16 toward the upper side of the vehicle grows larger, the buckling of the offset portion 16 into the chevron shape (the upward bending) is ensured more if the excessive load from the outside to the inside in the vehicle width direction is inputted to the wheel WH.

Next, a description will be given of a movement in the case where the excessive load from the outside to the inside in the vehicle width direction is inputted to the wheel WH (see FIG. 5).

An aspect of the wheel side portion 1A buckling due to the excessive load is schematically shown with dashed lines in FIG. 5.

When the load is inputted from the outside to the inside in the vehicle width direction, the wheel WH (the knuckle SS1) moves from a point P1 to a point P2, Then, along with the movement of the wheel WH, the wheel side portion 1A bends from a state S1 to a state S2 while raising the center of the offset portion 16.

When the load is further inputted, the offset portion 16 passes its elasticity limit and buckles as a consequence.

Next, a description will be given of the operation and effects of the vehicle suspension arm (the lower arm 1) of this embodiment.

The lower arm 1 (the vehicle suspension arm) of this embodiment is provided with the offset portion 16, which is located above the component force axis LF of the load with its gravity center C16 (the center of the cross section) being offset from the component force axis LF of the load.

For this reason, the offset portion 16 of the lower arm 1 buckles into the chevron shape (bends upward) if the excessive load from the outside to the inside in the vehicle width direction is inputted to the wheel WH.

In other words, in the lower arm 1, the ball shaft 21 and the socket 22 constituting the ball joint 20 are configured to buckle in such a direction (a predetermined direction) to come closer to each other in case of the input of the excessive load.

This inhibits the ball shaft 21 and the socket 22 from being separated from each other due to the excessive load, thereby inhibiting the wheel WH from coming off the vehicle body. In addition, this also makes it possible to tow and move the vehicle by using the wheel WH even if the vehicle gets hit broadside.

Meanwhile, as a consequence of inhibiting the ball shaft 21 and the socket 22 from separation, it is no longer necessary to increase a capacity of the ball joint 20 in order to control the buckling direction.

This makes it possible to suppress an increase in weight of the ball joint 20 associated with the increase in capacity.

In the lower arm 1 (the vehicle suspension arm) of this embodiment, the offset portion 16 is installed in the region located substantially in the middle of (substantially at equal distances from) the ball joint 20 (the joining member) and the front side vehicle body installation portion 14 (the vehicle body installation portion) in the wheel side portion LA.

In other words, the offset portion 16 is installed in such a region that is susceptible to a bending stress in the case of receiving the load from the outside to the inside in the vehicle width direction.

Accordingly, the offset portion 16 can cause the lower arm 1 to buckle as intended more reliably in the case of receiving the load from the outside to the inside in the vehicle width direction.

In the lower arm 1 (the vehicle suspension arm) of this embodiment, the offset amount D16 is set to be gradually increased from the wheel support portion 13 and the front side vehicle body installation portion 14 (the vehicle body installation portion) toward the center of the offset portion 16.

In other words, the offset portion 16 is set such that the region susceptible to the bending stress hollows deeper in the case of receiving the load from the outside to the inside in the vehicle width direction.

Accordingly, the offset portion 16 can cause the lower arm 1 to buckle as intended even more reliably in the case of receiving the load from the outside to the inside in the vehicle width direction.

The lower arm 1 (the vehicle suspension arm) of this embodiment is set to such a shape that the inner side edge of the wheel side portion 1A comes closer to the wheel WH than the outer side edge thereof does when the wheel WH is steered to the right and left due to steering by a driver.

Meanwhile, in the lower arm 1, the lower inner side wall 12*a*2 (the reverse side wall) erected in the opposite direction (toward the lower side of the vehicle) to the offset direction (toward the upper side of the vehicle) is formed at the inner side edge of the wheel side portion 1A.

Moreover, in the lower arm 1, the upper inner side wall 12*a*1 (the forward side wall) erected in the offset direction (toward the upper side of the vehicle) is formed at the inner side edge of the wheel side portion 1A.

In addition, the height dimension H12*a*1 of the upper inner side wall 12*a*1 of the offset portion 16 is set smaller than the dimension of the region other than the offset portion 16 in the wheel side portion 1A.

In this way, the lower arm 1 can have the external shape with the small height dimension H12*a*1 of the upper inner side wall 12*a*1 of the offset portion 16 while retaining sufficient strength.

Moreover, since the height dimension H12*a*1 of the upper inner side wall 12*a*1 can be reduced, the offset portion 16 can buckle more reliably without blocking the steering operation of the wheel WH.

The lower arm 1 (the vehicle suspension arm) of this embodiment is formed by subjecting the cast material of the aluminum alloy or the like to the forging process. However, the present invention is not limited only to this configuration.

For example, it is possible to use a manufacturing method of forming the arm body 11 and the side wall 12 by subjecting a plate-shaped metal material such as a steel plate to press work.

In other words, any manufacturing method and the lower arm 1 (the vehicle suspension arm) are applicable as long as the method and the vehicle suspension arm can achieve the above-described setting of the offset portion 16, and the operation and effect similar to this embodiment are available therefrom.

Meanwhile, in this embodiment, the lower arm 1 (the vehicle suspension arm) is adopted as the lower arm 1 of the strut-type suspension. However, the present invention is not limited only to this configuration.

For example, the lower arm 1 can be adopted as an upper arm (not shown) constituting a double wishbone-type suspension.

When the offset portion 16 is installed as the upper arm, the respective constituents are set in such away as to locate the gravity center C16 (the center of the cross section) below the component force axis LF of the load.

Moreover, the upper arm is caused to buckle into a V-shape (bend downward) at the offset portion 16 if an excessive load from the outside to the inside in the vehicle width direction is inputted to the wheel WH. By causing the upper arm to buckle into the V-shape (bend downward), the spherical head portion 25 and the socket 22 are displaced in such a direction to come close to each other.

In other words, it is possible to set the buckling direction as appropriate depending on the application of the vehicle suspension arm and the operation and effect similar to this embodiment are available therefrom.

Moreover, although the lower arm 1 of this embodiment includes the arm body 11 formed substantially into the L-shape, the present invention is not limited only to this configuration.

For example, it is also possible to form a lower arm having a rectilinear shape by using only the components corresponding to the wheel side portion LA and the front side vehicle body installation portion 14 of this embodiment while omitting the vehicle body side portion 1B and the rear side vehicle body installation portion 15.

The above-mentioned structure brings about a configuration in which the lower arm supports the wheel at one position and is supported by the vehicle body at one position.

Alternatively, it is also possible to form a lower arm having such a shape that a component corresponding to the vehicle side portion has a substantially V-shaped form.

The above-mentioned structure brings about a configuration in which the lower arm supports the wheel at one position and is supported by the vehicle body at two positions.

What is claimed is:

1. A vehicle suspension arm comprising:
    a wheel support portion configured to support a wheel through a joining member;
    a vehicle body installation portion to be installed in a vehicle body; and
    a wheel side portion configured to join the wheel support portion to the vehicle body installation portion, wherein
    the wheel side portion of the vehicle suspension arm includes an offset portion, and
    the offset portion has a cross-sectional shape with a gravity center offset upward or downward relative to an axis of a load indicating a component force to be applied from the wheel to the vehicle body when the load is inputted from a lateral side of the vehicle to the wheel.

2. The vehicle suspension arm according to claim 1, wherein the offset portion is installed in a region on the wheel side portion located substantially at equal distances from the joining member and from the vehicle body installation portion.

3. The vehicle suspension arm according to claim 1, wherein an offset amount of the offset portion is set to be gradually increased from any of the wheel support portion and the vehicle body installation portion toward a center of the offset portion.

4. The vehicle suspension arm according to claim 1, wherein
    the wheel side portion includes
        a reverse side wall erected in an opposite direction to an offset direction, and
        a forward side wall erected in the offset direction,
    the reverse side wall and the forward side wall are located at one of side edges which comes closer to the wheel when the wheel is steered to right and left along with steering by a driver, and
    a height dimension of the forward side wall of the offset portion is set smaller than a dimension of a region other than the offset portion.

* * * * *